(12) United States Patent
Mizue et al.

(10) Patent No.: US 7,008,119 B2
(45) Date of Patent: Mar. 7, 2006

(54) OPTICAL MODULE

(75) Inventors: Toshio Mizue, Kanagawa (JP); Kazushige Oki, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/759,537

(22) Filed: Jan. 20, 2004

(65) Prior Publication Data
US 2004/0208459 A1      Oct. 21, 2004

(30) Foreign Application Priority Data
Jan. 21, 2003    (JP) ............................ 2003-012617

(51) Int. Cl.
*G02B 6/36*    (2006.01)

(52) U.S. Cl. ............................. 385/88; 385/89; 385/92
(58) Field of Classification Search ................. 385/88, 385/89, 92, 94
See application file for complete search history.

(56) References Cited

U.S. PATENT DOCUMENTS

| 5,784,513 | A |   | 7/1998  | Kuribayashi et al. |
| 5,802,230 | A | * | 9/1998  | Kuribayashi et al. ......... 385/92 |
| 6,126,325 | A | * | 10/2000 | Yamane et al. ............... 385/92 |

* cited by examiner

*Primary Examiner*—Sung Pak
(74) *Attorney, Agent, or Firm*—McDermott Will & Emery LLP

(57) ABSTRACT

This invention provides an optical module that enables to reduce an optical coupling loss when an external force is applied to an optical connector mating with the optical module. The present optical module comprises an optical sub-assembly and an optical receptacle having a cavity for receiving the optical connector and a space for receiving the optical sub-assembly. The optical sub-assembly provides a flange in its outer surface and the head portion thereof passes through the partition wall between the cavity and the space. Between the flange of the optical sub-assembly and the partition wall of the optical receptacle provides an O-ring, whereby the head portion of the optical sub-assembly enables to displace in the cavity and automatically recovers its original position.

8 Claims, 9 Drawing Sheets

OPTICAL MODULE

BACKGROUND OF THE INVENTION

1. Field of the Invention

The present invention relates to an optical module used in an optical communication.

2. Related Prior Art

Conventional optical modules used in the optical communication have been well known in U.S. Pat. No. 5,784,513, Kuribayashi et al. The optical module disclosed in the patent includes an optical sub-assembly and a flexible circuit board therein. Ferrules provided in the sub-assembly and in the optical connector are facing to each other within a slit sleeve, thereby enabling an optical coupling between the sub-assembly and the optical connector.

In the conventional optical module, when an external force is applied to the optical connector as the connector is fitting into the optical module, it may be occurred that the ferrule in the optical connector is displaced and the optical coupling loss between the ferrules may increase.

An object of the present invention is to provide an optical module, in which loss of optical coupling is reduced even when an external force is applied to the optical connector mating therewith.

SUMMARY OF INVENTION

According to an aspect of the present invention, an optical module that mates with an optical connector including an optical fiber therein, comprises an optical sub-assembly, an optical receptacle and an elastic member disposed between the optical receptacle and the optical sub-assembly. The sub-assembly includes an optical device such as a semiconductor laser diode and a semiconductor photodiode that optically couples to the optical fiber. The optical receptacle includes a cavity for receiving the optical connector and a space for receiving the optical sub-assembly.

The optical receptacle of the present optical module may provide a groove in an inner wall surface thereof. The groove has a front groove surface and a rear groove surface. The optical sub-assembly further provides a flange in an outer surface thereof. The flange of the optical sub-assembly and the elastic member are preferably disposed within the groove of the optical receptacle such that the elastic member is disposed between the flange and the front groove surface.

Since the present optical module provides the elastic member between the optical sub-assembly and the optical receptacle, the optical sub-assembly is capable to tilt in the cavity. This reduces the increase of the optical coupling loss between the optical sub-assembly and the optical connector when an external force is applied to the optical connector.

The optical module of the present invention may further comprise a bracket disposed between the flange and the rear groove surface of the optical receptacle. Since the bracket fills a gap between the flange and the rear groove surface of the receptacle, the optical sub-assembly rigidly secured and aligned to the optical receptacle.

The optical module of the present invention may further include a partition wall for partitioning the cavity from the space. A tip of the optical sub-assembly appears in the cavity by passing the partitioning wall. The elastic member may be disposed between the partitioning wall of the optical receptacle and the flange of the optical sub-assembly.

According to another aspect of the present optical module, the optical module comprises an optical receptacle, an optical sub-assembly and a bracket. The optical receptacle provides a groove in an inner wall surface thereof and the optical sub-assembly provides another groove in an outer surface thereof. The another groove in the optical sub-assembly has a front groove surface and a rear groove surface. The bracket is in contact with the front groove surface in the optical sub-assembly, and the elastic member is disposed between the rear groove surface in the optical sub-assembly and the bracket.

In this arrangement, since the bracket fills an gap between the front groove surface in the optical sub-assembly and the elastic member, the optical sub-assembly is rigidly secured and aligned to the optical receptacle. Moreover, since the elastic member is disposed between the bracket and the rear groove surface in the optical sub-assembly, the optical sub-assembly is capable to tile in the optical receptacle.

The optical sub-assembly of the present invention may include an sleeve in the tip portion thereof and a coupling fiber optically coupled to the optical semiconductor device. The optical fiber secured in the optical connector is to be physically in contact with the coupling fiber when the optical connector mates with the optical receptacle, namely, the ferrule provided in the optical connector is inserted into the sleeve provided in the optical sub-assembly.

The elastic member is preferably an O-ring or an article comprising a ring portion and a plurality of limb portion. The limb portions extend from the ring portion to an inside thereof and warp therefrom.

DETAILED DESCRIPTION OF PREFERRED EMBODIMENTS

Next, preferred embodiments of the present invention will be described as referring to accompanying drawings.

(First Embodiment)

Figure 1:
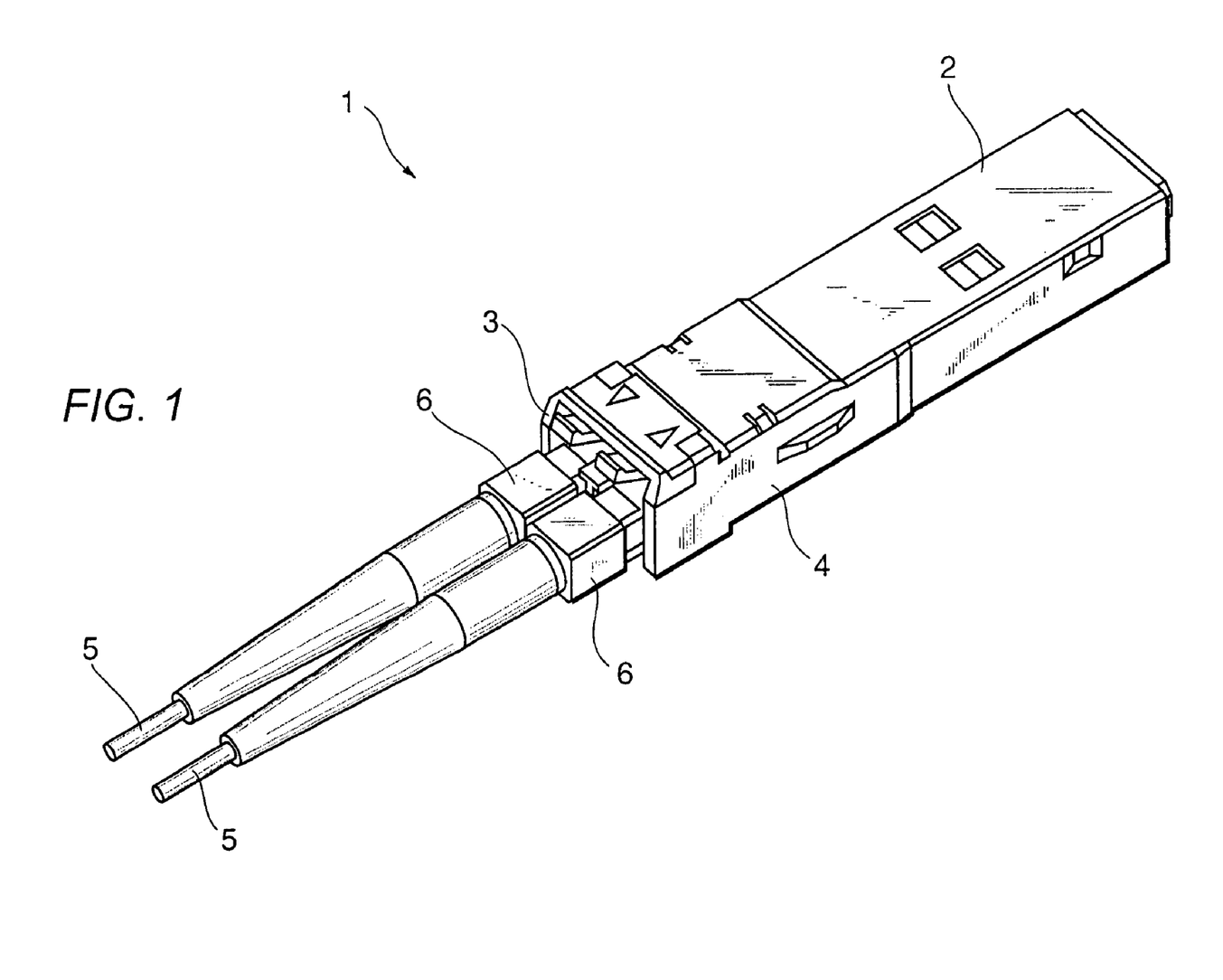
FIG. 1 is a perspective view of an optical module according to the present invention with an optical connector fitted thereto.

The first embodiment according to the present invention will be described as referring to FIGS from 1 to 4. FIG. 1 is a perspective view showing an optical module of the present invention and an optical connector mating therewith. The optical module 1 is an optical transmitting/receiving module, which is called as an optical transceiver. The optical module 1 comprises a housing 2, an optical receptacle 3 and a cover 4 for covering the housing 2 and the optical receptacle 3. The optical receptacle 3 mates with an optical connector 6 that secures an optical fiber 5.

Figure 2:
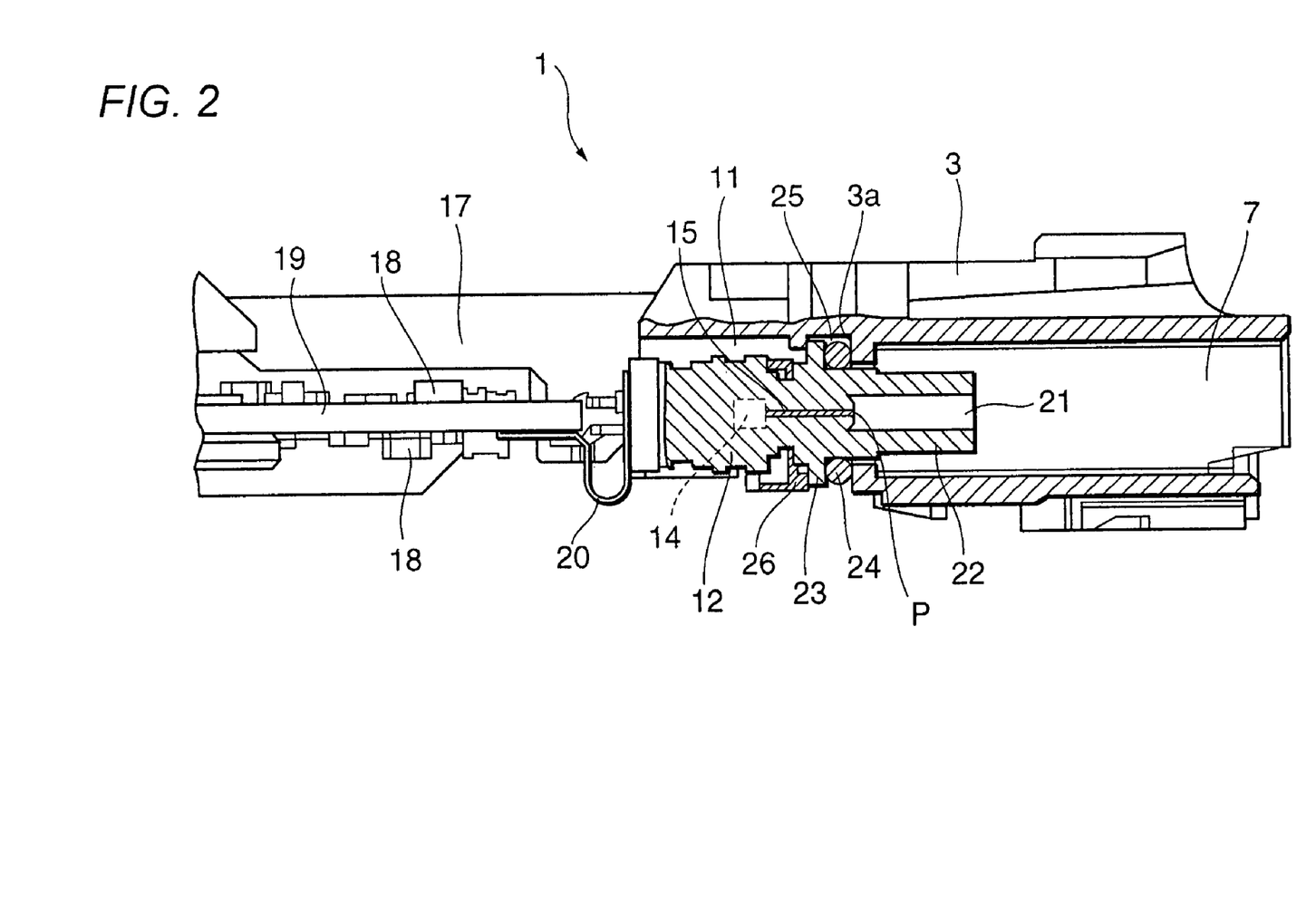
FIG. 2 is a longitudinal sectional view of a primary portion of the optical module.

FIG. 2 is a longitudinal sectional view of a primary portion of the optical module 1. In a front side of the optical receptacle, two cavities for receiving the optical connector are provided. In the description, the side where the optical connector is mated with is called as the front side for the sake of convenience. However in the practical module, the front and the rear have no effect in the function of the optical module. The shape of the cavity 7 depends on the outer shape of the optical connector.

A head portion of the optical connector 6 provides a plug 8. The plug 8 is inserted into the cavity 7 of the optical receptacle 3. A ferrule 9, within which an optical fiber is secured, is disposed in the plug 8. A flange is provided in the outer surface of the ferrule 9. Between the flange and the projection provided in the inner surface of the plug 8 is disposed a coil spring such that the ferrule 9 passes through the center of the coil spring. Thus, the ferrule 9 may move relatively to the plug 8 by the coil spring. Namely, the tip of the ferrule 9 may be drawn back into the plug 8 and the ferrule 9 may not be broken out from the plug 8 because the projection of the inner surface of the plug 9 functions as a stopper for the flange of the ferrule 9. The optical fiber 5 is secured in the ferrule 9 as the sheath 5a thereof is split and the bared fiber 5b is exposed. The tip surface of the ferrule 9 and that of the optical fiber 5 meet with each other.

The optical receptacle 3 provides two spaces 11 for receiving optical sub-assemblies in the rear side of respective cavities 7. One space is provided for a transmitting optical sub-assembly 12 (hereinafter denoted as TOSA) and the other space is provided for a receiving optical sub-assembly 13 (hereinafter denoted as ROSA). The TOSA contains a light-transmitting semiconductor device 14, such as a semiconductor laser diode, and the light-emitting device 14 optically couples to a coupling fiber 15 extending to the head portion of the TOSA. The ROSA 13 contains a light-receiving semiconductor device, such as a semiconductor photodiode. The partition wall that divides the cavity 7 from the space 11 is pierced by two openings, an inner diameter of which is slightly greater than an outer diameter of the head portion of the TOSA and the ROSA. The head portions of the TOSA 12 and the ROSA 13 protrude into respective cavities 7 as passing the partition wall.

In the rear side of the spaces 11 for installing respective optical sub-assemblies 12 and 13, another space 17 is provided for receiving a wiring substrate 19. The wiring substrate 19 mounts a plurality of electronic components 18 on both surfaces thereof. The TOSA 12 is electrically connected to the wiring substrate 19 with a flexible circuit board 20, thereby connecting the light-emitting semiconductor device in the TOSA 12 to the electronic components 18 on the wiring substrate 19. The ROSA 13 is electrically connected to the wiring substrate 19 with a plurality of lead terminals.

Figure 4:
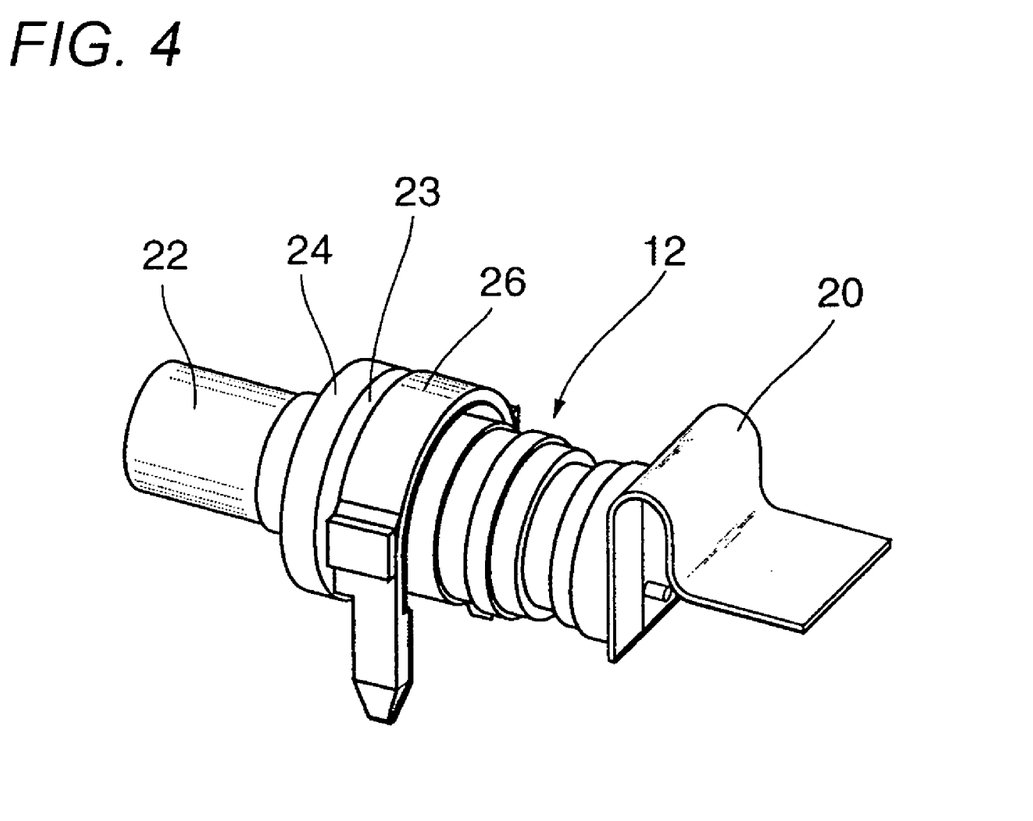
FIG. 4 is a perspective view of the transmitting optical sub-assembly installed in the optical module shown in FIG. 2 and FIG. 3.

FIG. 4 is a perspective view of the TOSA 12 with some additional components attached thereto. The TOSA 12 provides a sleeve 22 in the head portion thereof for mating with the ferrule 9 of the optical connector 6. The ferrule 9 is inserted into the inside 21 of the sleeve 22. Further, the TOSA 12 provides a flange 23 in the outer surface thereof. The rear side of the flange 23 provides a bracket 26, and the TOSA 12 with the bracket 26 being fitted thereto is installed in the space 11 of the receptacle 3. The rear end of the TOSA 12 provides the flexible circuit board 20 for electrically connecting to the wiring board 19.

Figure 3A:
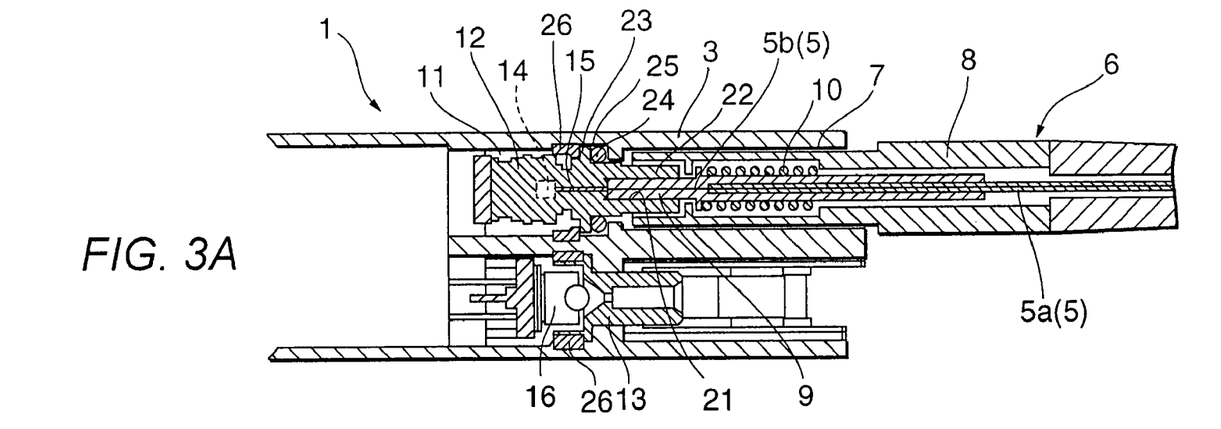
FIG. 3 is a transverse sectional view showing the optical module when an external force applied to the optical connector.

As shown in FIG. 2 and FIG. 3, the space 11 provides a groove 25 including a front surface 3a and a rear surface. Between the front surface 3a of the groove 25 and the flange 23 of the TOSA 12 disposes an O-ring 24, which is made of elastic material such as synthesis rubber. The TOSA 12, fitting the O-ring thereto is placed in the space 11, the O-ring is in contact with the flange 23 and the surface 3a of the groove 25. The O-ring may displace the head portion of the TOSA 12 within the space 11 like the precession motion due to the elasticity of the O-ring 24. Moreover, since the opening, into which the head portion of the TOSA 12 is inserted, has a slightly greater inner diameter than the outer diameter of the head portion, not only the head portion but also the rear end portion of the TOSA 12 may displace in the space 11.

Further, the TOSA 12 is placed in the space 11 by fitting the bracket 26 into the opposite side of the flange 23 against the O-ring 24. The bracket 26 is made of material enough stiffer than the O-ring 24, such as engineering plastics. By setting a total dimension of the thickness of the O-ring 24, that of the flange 23 and the width of the bracket 26 slightly greater than the width of the groove formed in the inner surface of the space 11, the TOSA 12 may be secured within the space 11 with the bracket 26 along the direction parallel to the optical fiber. The elasticity of the O-ring 24 enables to displace in precessional motion even when the TOSA 12 is rigidly set in the space 11.

Since the displacement of the TOSA along the optical axis is forbidden by the bracket inserted so as to fill the gap between the flange and the rear surface of the groove 25, the position of the reference plane P with respect to the optical axis is fixed. The reference plane P in FIG. 2 includes the point, where the optical fiber 5 in the optical connector 6 and the coupling fiber 15 in the TOSA 12 are in physically contact with each other, and extends along the direction normal to the optical axis. Therefore, when the ferrule 9 mates with the sleeve 22 of the TOSA 12, the optical fiber 5 in the ferrule 9 may successfully and reliably couple to the coupling fiber 15 in the TOSA 12.

Figure 5A:
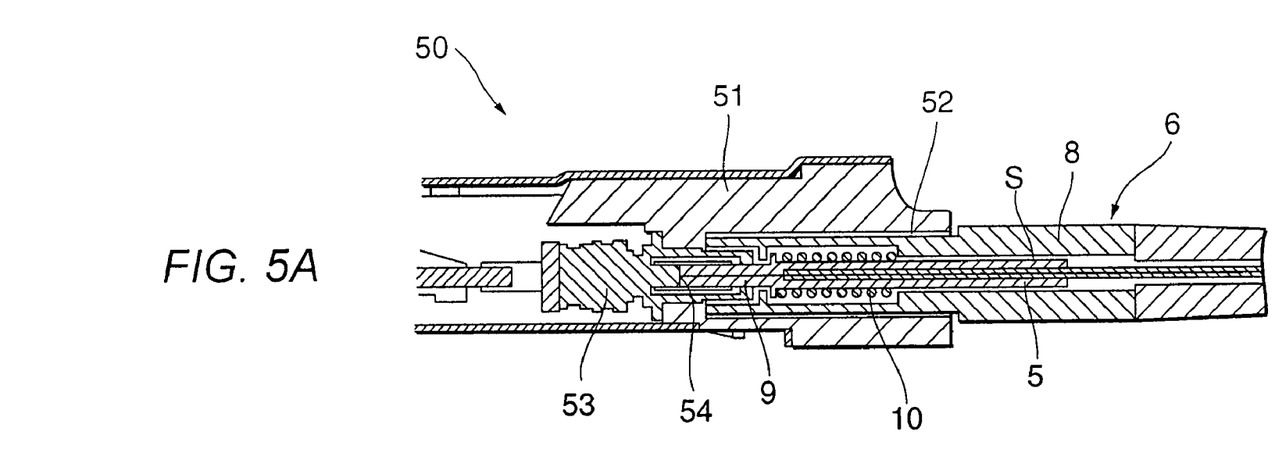
FIG. 5 is a longitudinal sectional view of a conventional optical module when an external force is applied to the optical connector.
Figure 5B:
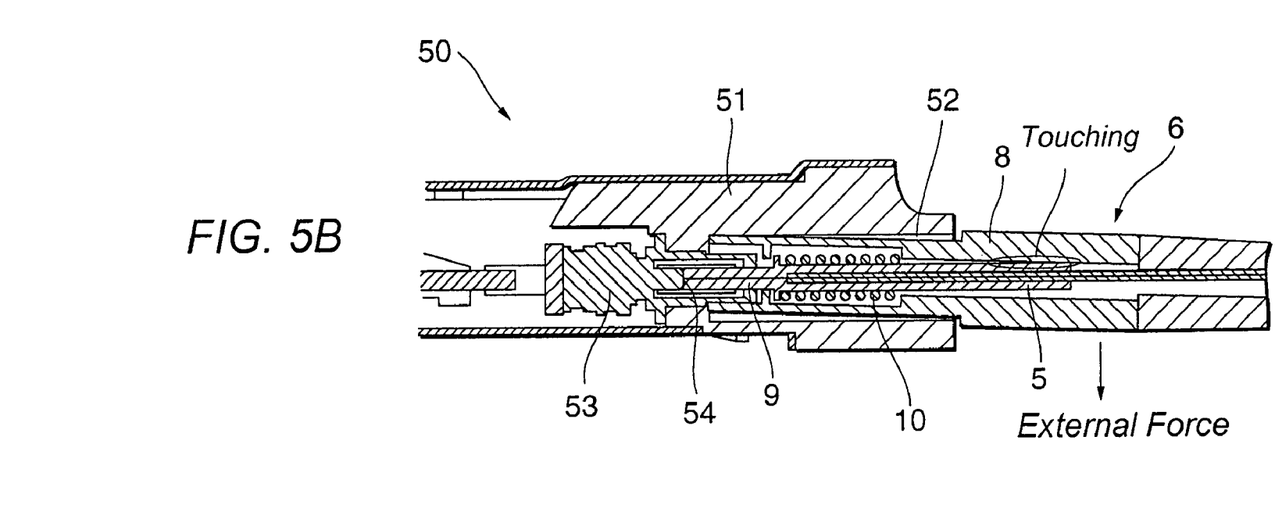

FIG. 5 shows a conventional mating mechanism of the optical connector and the optical module. The optical module 50 includes an optical receptacle 51 having a cavity 52 for receiving the optical connector into the front side thereof. Within the optical receptacle 51, a TOSA 53 having a light-transmitting semiconductor device and an coupling fiber therein is disposed. The head portion of the TOSA 53 provides a sleeve 54. The TOSA 53 is rigidly secured to the optical receptacle.

Generally, when an external force due to the dead load of the optical cable or any manually affected operation is applied to the optical connector 6 when the ferrule in the plug 8 is inserted into the sleeve 54, the spring may alleviate the external force such that the position of the ferrule is not influenced. However, when the clearance between the ferrule 9 and the inner surface of the plug 8 is insufficient, the inner surface of the plug 8 will be in contact with the ferrule 9 by the displacement of the plug 8 due to the external force applied thereto. The displacement or the tilt of the ferrule causes an inferior optical coupling between the optical fiber in the ferrule and that in the TOSA 53, which results in the increase of the optical coupling loss.

Figure 3B:
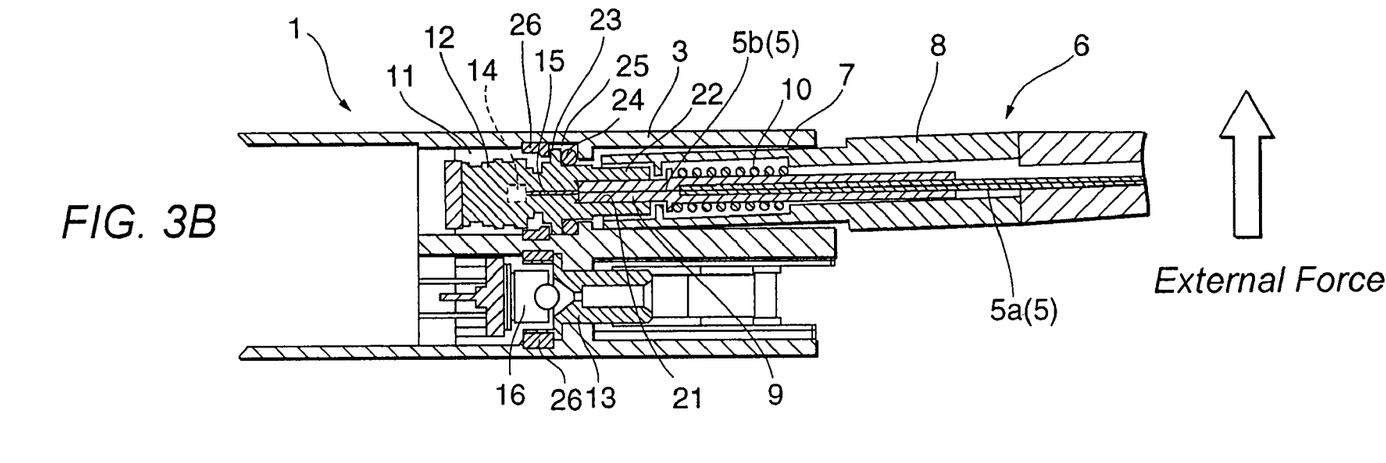

On the other hand in the present invention, the optical module 1 provides an elastic member such as the O-ring 24 between the receptacle 3 and the TOSA 12. Therefore, even when the external force is applied as the ferrule 9 is inserted into the sleeve 22, as shown in FIG. 3B, the O-ring 24 may alleviate the effect of the external force. Namely, even if the plug 8 is tilted by the applied force, the head portion of the TOSA 12 may move like the precession motion.

Thus, the tip of the ferrule 9 may escape from the touching to the inner surface of the plug 8, which maintains the physical contact between the fibers 5 and 15 in the ferrule 9 and the TOSA 12. This suppresses the increase of the optical coupling loss. Practically, the coupling loss did not exceed 0.5 dB when the external force of 2 kgf was applied to the connector 6.

Moreover, when the optical connector is pulled back from the optical receptacle 3 as the head portion of the TOSA is displaced with respect to the optical axis, the TOSA 12 may recover the original position due to the elasticity of the O-ring 24. This also enables that, when the optical connector 6 mates with the optical receptacle 3 again, the ferrule 9 may readily and reliably be inserted into the sleeve 22.

In the embodiment above described, only the TOSA 12 and the space 11 for receiving the TOSA 12 have specific structures according to the present invention. While, the ROSA 13 is installed in the space 11 merely by fitting the bracket 26 thereto. However, it may be also possible to provide the O-ring 24 and some other structures based on the present invention in the ROSA 13, and to tile the ROSA like the precession motion, which enhances the reliability of the optical coupling between the ROSA and the optical fiber.

(Second Embodiment)

Figure 6:
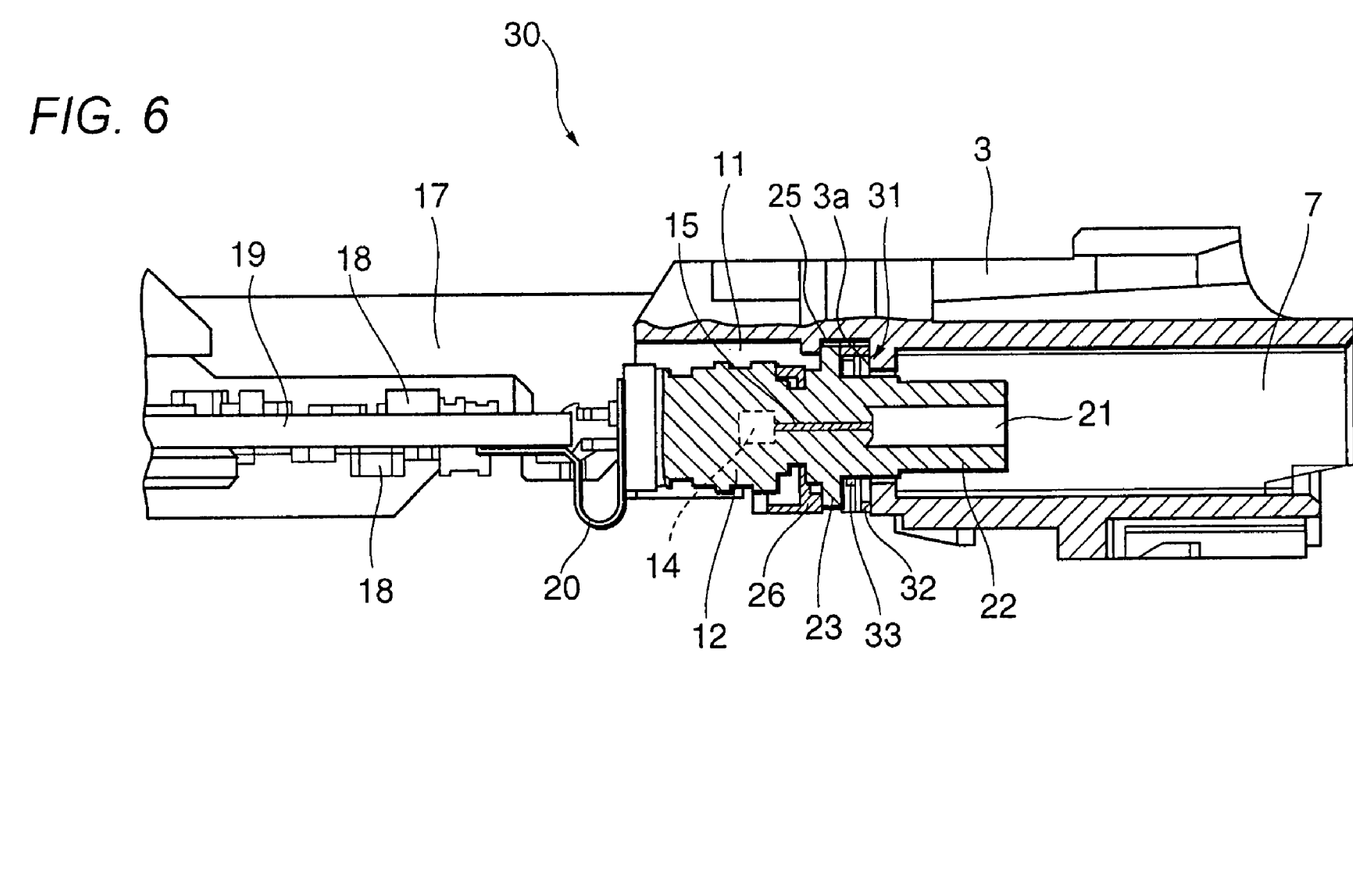
FIG. 6 is a longitudinal sectional view of an optical module accroding to the second embodiment of the present invention.
Figure 7:
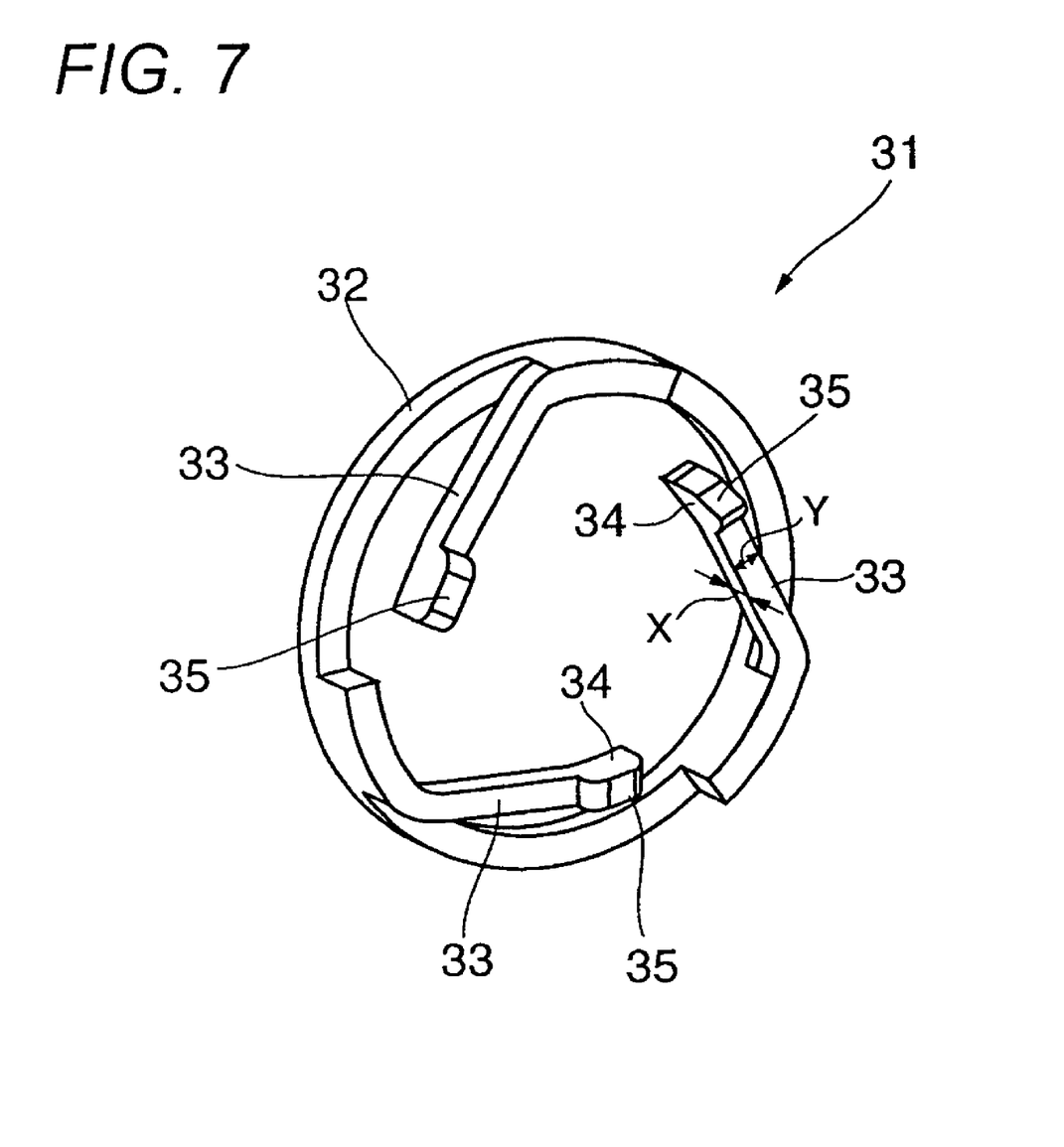
FIG. 7 is a perspective view of an elastic member used in the optical module shown in FIG. 6.
Figure 8A:
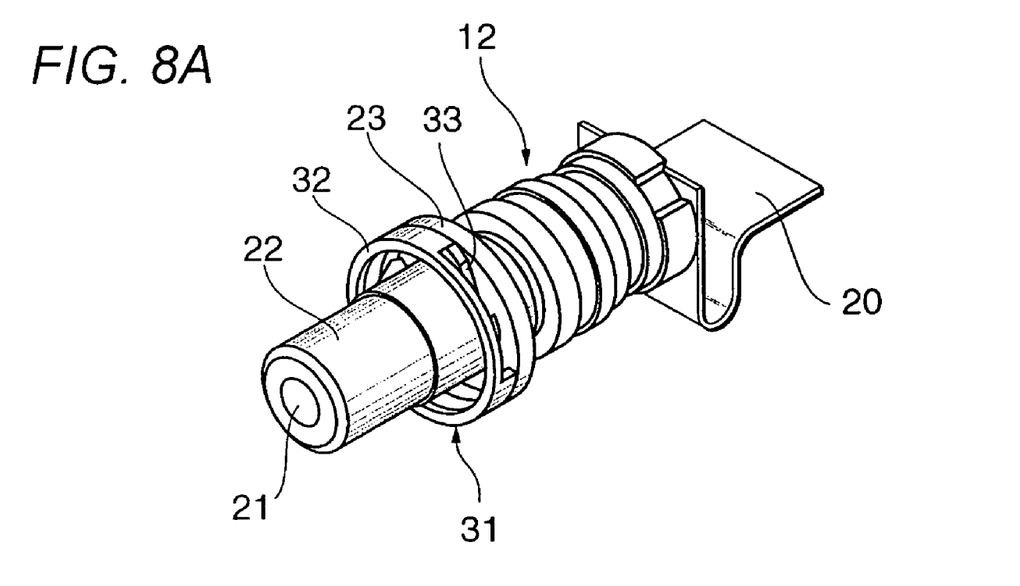
FIG. 8 is a perspective view showing an optical sub-assembly installed in the optical module shown in FIG. 6.
Figure 8B:
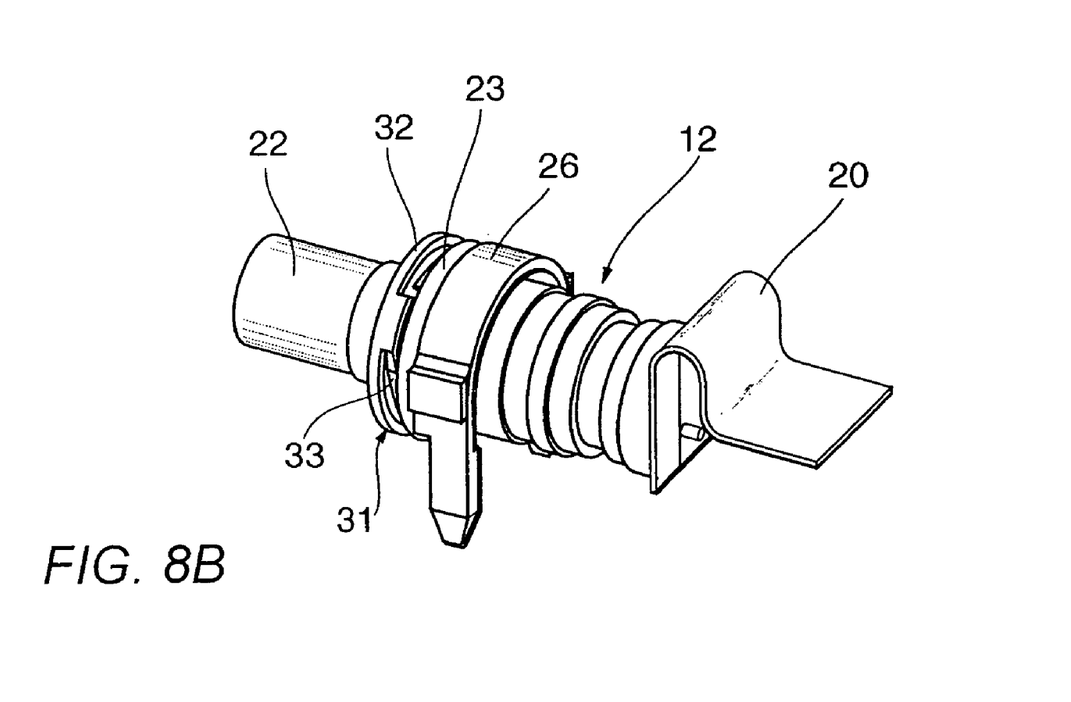

The second embodiment of the present invention will be described as referring to FIGS from 6 to 8. In drawings, elements identical to each other will be referred to with identical symbols without overlapping explanation.

FIG. 6 is a longitudinal sectional view of an optical module 30 according to the second embodiment. The optical module 30 provides an elastic member 31 in place of the O-ring 24 of the first embodiment.

The elastic member 31, as shown in FIG. 7, comprises a ring portion 32 and a plurality of limb portions 33. The limb portion extends from the ring portion to the inside thereof and warps from the ring portion 32. The elastic member 31 may be made of stainless steel or some engineering plastics hard to creep, such as Poly-Ether-Sulfone (PES) and Poly-Phenylene-Sulfide (PPS) containing glass as filler. By forming the elastic member 31 with such material, the elastic member 31 may bring uniform force to the displacement of the limb portion 33 from the ring portion 32.

The elastic member 31 is fit into the TOSA 12 such that the tip of the limb portion 33 is in contact with the flange 23 of the TOSA as shown in FIG. 8. The tip of respective limb portions 33 has a first surface 34 to be in contact with the outer surface of the TOSA 12 and a second surface 35 to be in contact with the flange 23. The other surface of the ring portion 32 opposite to the limb portion 33, is to be in contact with the front surface 3a of the groove 25, as shown in FIG. 6.

In FIG. 7, the stiffness of the limb portion 33 increases as the width X thereof increases, which also enhances the pressing force against the partition wall of the space 11. On the other hand, the spring constant of the limb portion 33 decreases as the thickness Y thereof decreases and the length thereof increases, which facilitates the limb portion 33 to bent toward the ring portion 32, thereby enabling the head portion of the TOSA 12 to tilt like precession motion in the cavity 7.

(Third Embodiment)

Figure 9:
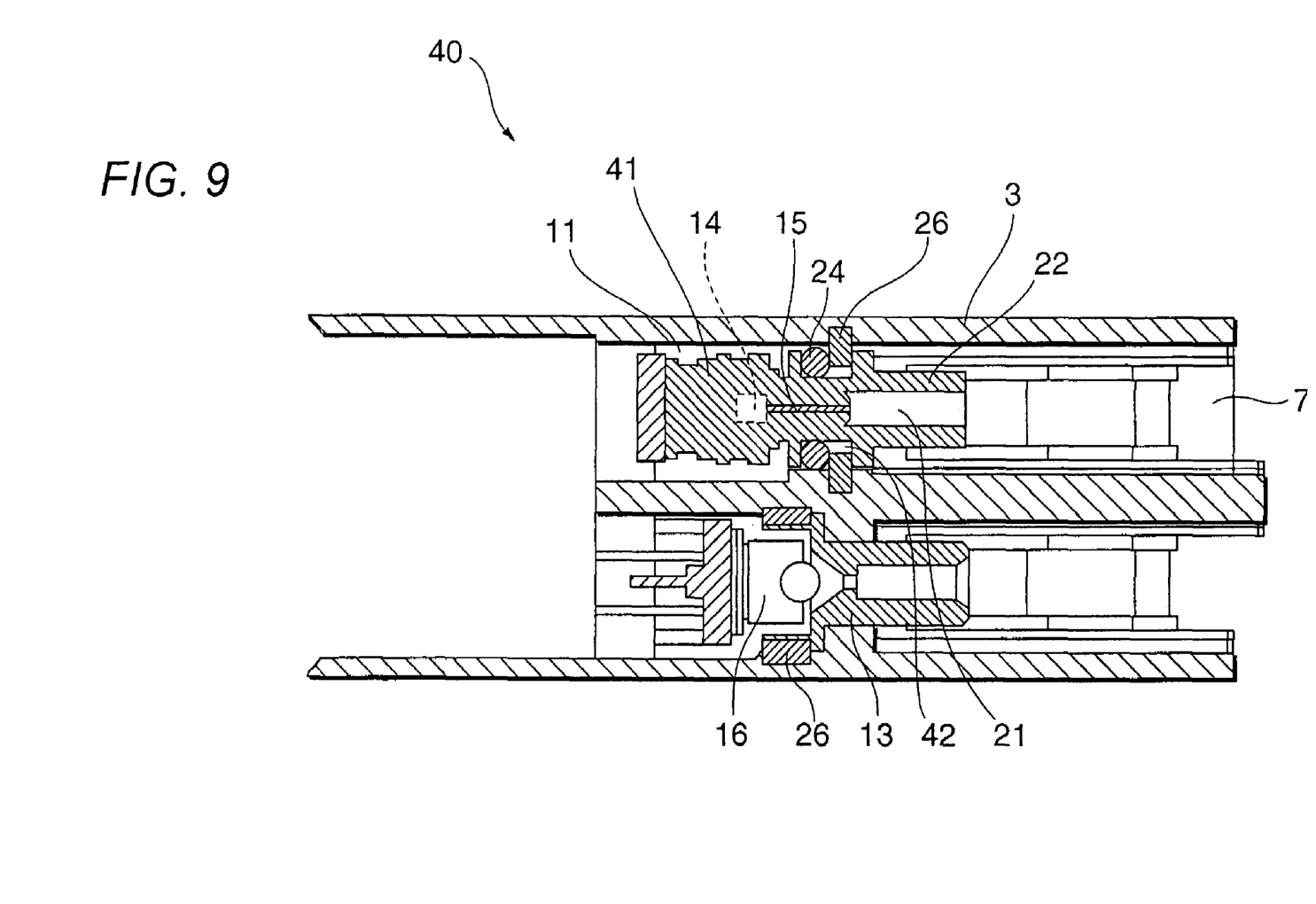
FIG. 9 is a longitudinal sectional view of an optical module according to the third embodiment of the present invention.

Another embodiment according to present invention will be described as referring to FIG. 9. In FIG. 9, elements identical to that of the first embodiment is referred with identical symbols without overlapping explanation.

In FIG. 9, an optical module 40 provides a TOSA 41 in place of the TOSA 12 of the first embodiment. The optical module 40 does not provide any inner wall that partitions the cavity 7 from the space 11. The TOSA 41 provides two flanges that form a groove 42 in its outer surface. Between two flanges, the O-ring 24 and the bracket 26 are fitted. In the inner surface of the receptacle 3, another groove for receiving the bracket 26 is provided. Fitting the O-ring 24 to the groove 42 of the TOSA 41, installing the TOSA 41 in the predetermined position of the optical receptacle 3, and fitting the bracket 26 into the groove formed in the inner surface of the optical receptacle, the TOSA 41 may be rigidly positioned in the optical receptacle 3. The head portion of the TOSA 22 may tilt in the cavity like precession motion against the optical axis by inserting the elasticity of the O-ring 24 between the TOSA 41 and the bracket 26

From the embodiment thus described, the spirit and its application of the present invention will be understood. The scope of the present invention will not be restricted to such embodiment. For example, embodiments use the bracket 26 for fitting the optical sub-assembly to the optical receptacle. However, it may be applicable that the optical sub-assembly provides a groove in its outer surface and a projection formed in the inner wall surface of the optical receptacle mates with the depression.

Moreover, the optical transceiver that provides both the TOSA and the ROSA is exemplary described in the specification. The present invention may be applicable to the optical transmitting module that provides only the TOSA and to the optical receiving module that provides only the ROSA.

What is claimed is:

1. An optical module to be mated with an optical connector that includes an optical fiber, comprising:

an optical sub-assembly having a head portion, said optical sub-assembly including an optical semiconductor device therein;

an optical receptacle having a catty for receiving said optical connector and a space for receiving said optical sub-assembly, said optical receptacle having a groove with a front surface and a rear surface in an inner wall surface thereof, said rear surface being in direct contact with said flange of said optical sub-assembly; and an elastic member disposed between said front surface of said groove and said flange of said optical sub-assembly, wherein said elastic member enables said head portion of said optical sub-assembly to displace within said cavity.

2. The optical module according to claim 1, further comprises a bracket disposed between said flange and said rear surface of said groove;

wherein said bracket aligns said optical sub-assembly with said optical receptacle, and said flange of said optical sub-assembly is in contact with said rear surface of said groove through said bracket.

3. The optical module according to claim 2, wherein said elastic member is an O-ring.

4. The optical module according to claim 2, wherein said elastic member comprises a ring portion and a plurality of limb portions extending from said ring portion to an inside thereof and warping from said ring portion, said plurality of limb portions being in contact with said front surface of said groove and said ring portion being in contact with said flange.

5. The optical module according to claim 1, wherein said elastic member is an O-ring.

6. The optical module according to claim 1, further includes a partition wall for dividing said cavity from said space, and said optical sub-assembly further includes a flange in an outer surface thereof, wherein said head portion protrudes to said cavity by passing through said partitioning wall, and said elastic member is disposed between said partition wall and said flange.

7. The optical module according to claim 1, wherein said optical sub-assembly further includes an sleeve and a coupling fiber optically coupled to said optical semiconductor device, wherein said optical connector includes a ferrule securing said optical fiber therein, and wherein said optical fiber secured in said optical connector is physically in contact with said coupling fiber when said ferrule of said optical connector 10 mates with said sleeve of said optical sub-assembly.

8. An optical module to be mated with an optical connector that includes an optical fiber, comprising:

an optical sub-assembly having a head portion, and a groove with a front groove surface and a rear groove surface in an outer surface thereof, said optical sub-assembly including an optical semiconductor device therein;

an optical receptacle having a cavity for receiving said optical connector and a space for receiving said optical sub-assembly, said optical receptacle including a groove in an inner wall surface thereof;

a bracket disposed in said groove of said optical receptacle and being in contact with said front groove surface of said optical sub-assembly; and an elastic member disposed between said rear groove surface of said optical subassembly and said bracket, wherein said elastic member enables said head portion of said optical sub-assembly to displace within said cavity.

\* \* \* \* \*